United States Patent
Thota et al.

(10) Patent No.: US 8,805,285 B2
(45) Date of Patent: Aug. 12, 2014

(54) SYSTEM AND METHODS FOR AVOIDING INTERFERENCE BETWEEN COMMUNICATIONS IN DIFFERENT FREQUENCY BANDS

(75) Inventors: Sudheep K. Thota, San Jose, CA (US); Hsin-Yuo Liu, Fremont, CA (US)

(73) Assignee: Apple Inc., Cupertino, CA (US)

( * ) Notice: Subject to any disclaimer, the term of this patent is extended or adjusted under 35 U.S.C. 154(b) by 225 days.

(21) Appl. No.: 13/274,688

(22) Filed: Oct. 17, 2011

(65) Prior Publication Data
US 2013/0095760 A1 Apr. 18, 2013

(51) Int. Cl.
*H04B 1/00* (2006.01)
*H04B 15/00* (2006.01)

(52) U.S. Cl.
USPC .......................... 455/63.1; 455/501; 455/509

(58) Field of Classification Search
CPC .................................................. H04W 40/00
USPC ......... 455/41.2, 62, 73, 450, 501, 509, 553.1, 455/63.1
See application file for complete search history.

(56) References Cited

U.S. PATENT DOCUMENTS

| | | | |
|---|---|---|---|
| 2009/0138745 A1 | 5/2009 | Dorsey et al. | |
| 2010/0137025 A1* | 6/2010 | Tal et al. | 455/553.1 |
| 2010/0283665 A1 | 11/2010 | Bashir et al. | |
| 2010/0316089 A1 | 12/2010 | Liu et al. | |
| 2010/0317356 A1* | 12/2010 | Roessel et al. | 455/450 |
| 2011/0116490 A1* | 5/2011 | Wilhelmsson et al. | 370/343 |

* cited by examiner

*Primary Examiner* — Tuan H Nguyen
(74) *Attorney, Agent, or Firm* — Treyz Law Group; Chih-Yun Wu

(57) ABSTRACT

An electronic device may include wireless communications circuitry that communicates in multiple radio-frequency communications bands such as cellular or local area network bands. The radio-frequency communications bands may be divided into channels that are each associated with a frequency range within a corresponding radio-frequency communications band. The electronic device may identify whether frequency harmonics associated with communications in a first radio-frequency communications band interfere with communications in a second radio-frequency communications band. The electronic device may identify channels in the second radio-frequency communications band that are affected by the frequency harmonics of the communications in the first radio-frequency communications band and configure the wireless communications circuitry to avoid communicating in the identified channels.

20 Claims, 7 Drawing Sheets

SYSTEM AND METHODS FOR AVOIDING INTERFERENCE BETWEEN COMMUNICATIONS IN DIFFERENT FREQUENCY BANDS

BACKGROUND

This relates generally to wireless electronic devices, and more particularly, to wireless electronic devices that operate simultaneously in different radio-frequency communications bands.

Electronic devices such as computers and cellular telephones are often provided with wireless communications capabilities. For example, electronic devices may use long-range wireless communications circuitry such as cellular telephone circuitry. Global Positioning System (GPS) receiver circuitry and other satellite receiver circuitry may be used to receive satellite navigation signals. Local wireless links may be used to support local area network communications such as IEEE 802.11 communications at 2.4 GHz, 3.6 GHz, and 5 GHz (sometimes referred to as WiFi communications). Local links may also be used to handle Bluetooth and Bluetooth Low Energy communications at 2.4 GHz. Each of the radio-frequency communications bands correspond to a range of frequencies. For example, the 2.4 GHz band corresponds to a range of frequencies between 2.4 GHz to 2.5 GHz.

It is often desirable for a device to support simultaneous communications in multiple frequency bands. For example, users of a cellular telephone may communicate with cellular telephone towers using one or more different cellular telephone bands while communicating with local area network equipment using wireless local area network (WLAN) or Bluetooth communications bands.

Wireless electronic devices may be based on components such as transistors that exhibit non-linear behavior. As a result, undesired frequency harmonics may be generated when radio-frequency signals are transmitted in a given frequency band using the wireless electronic devices. For example, second harmonics, third harmonics, and higher-order harmonics of the radio-frequency signals may be generated. If care is not taken, these harmonic signals may interfere with radio-frequency communications in other frequency bands.

To handle wireless communications in environments such as these, it would be desirable to provide wireless electronic devices with improved interference handling capabilities.

SUMMARY

An electronic device may include wireless communications circuitry that communicates in multiple radio-frequency communications bands. The communications bands may be associated with cellular standards such as Global System for Mobile (GSM), Universal Mobile Telecommunications System (UMTS) or local area network standards such as WiFi, Bluetooth, or Bluetooth Low Energy (BTLE). The radio-frequency communications bands may be divided into channels that are each associated with a frequency range within a corresponding radio-frequency communications band.

The electronic device may include storage and processing circuitry that identifies whether frequency harmonics associated with communications in a first radio-frequency communications band interfere with communications in a second radio-frequency communications band. For example, the storage and processing circuitry may identify whether frequency harmonics associated with cellular communications between the electronic device and a base station interfere with communications in Bluetooth Low Energy or WiFi channels. The storage and processing circuitry may identify channels in the second radio-frequency communications band that are affected by the frequency harmonics of the first radio-frequency communications band and configure the wireless communications circuitry to avoid communicating in the identified channels. For example, the storage and processing circuitry may send commands to the wireless communications circuitry that identify Bluetooth Low Energy channels that are not affected by frequency harmonics associated with cellular communications.

Further features of the invention, its nature and various advantages will be more apparent from the accompanying drawings and the following detailed description of the preferred embodiments.

DETAILED DESCRIPTION

Figure 1:
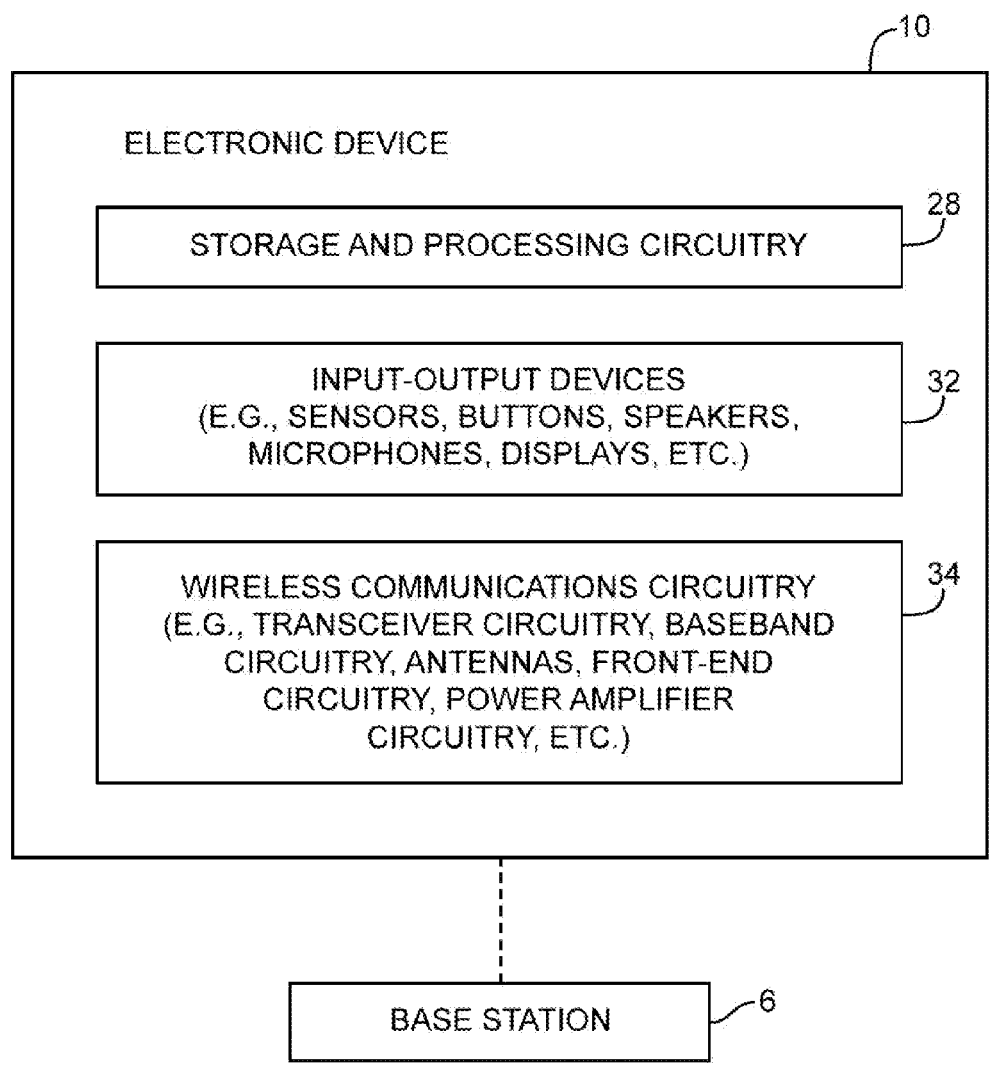
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support long-range wireless communications such as communications in cellular telephone frequency bands (e.g., ranges of frequencies associated with wireless standards or protocols). Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other frequency bands. Each long-range band may be associated with a range of frequencies. For example, the 850 MHz band may be associated with frequency range 824-849 MHz. Examples of wireless standards or protocols that are associated with the cellular telephone frequency bands include Global System for Mobile (GSM) communications standard, the Universal Mobile Telecommunications System (UMTS) standard, and standards that use technologies such as Code Division Multiple Access, time division multiplexing, frequency division multiplexing, etc. The long-range bands used by device 10 may include the so-called LTE (Long Term Evolution) bands. The LTE bands are numbered (e.g., 1, 2, 3, etc.) and are sometimes referred to as E-UTRA operating bands. Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth links and Bluetooth Low Energy links at 2.4 GHz, etc.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to radio-frequency transmission and reception such as selection of communications frequencies, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi), protocols for other short-range wireless communications links such as the Bluetooth protocol, cellular telephone protocols, MIMO (multiple input multiple output) protocols, antenna diversity protocols, etc. Wireless communications operations such as communications frequency selection operations may be controlled using software stored and running on device 10 (e.g., stored and running on storage and processing circuitry 28).

Electronic device 10 may include wireless communications circuitry 34 for communicating wirelessly with external equipment. Therefore, electronic device 10 may sometimes be referred to as a wireless device or a wireless electronic device. Wireless communications circuitry 34 may include radio-frequency (RF) transceiver circuitry formed from one or more integrated circuits, baseband circuitry, power amplifier circuitry, low-noise input amplifiers, passive RF components, one or more antennas, transmission lines, and other circuitry such as front-end circuitry for handling RF wireless signals. Wireless signals can also be sent using light (e.g., using infrared communications).

Wireless communications circuitry 34 may include radio-frequency transceiver circuitry for handling various radio-frequency communications bands. For example, circuitry 34 may include transceiver circuitry that handles 2.4 GHz and 5 GHz bands for WiFi (IEEE 802.11) communications and/or handles the 2.4 GHz band for Bluetooth communications. Circuitry 34 may include cellular telephone transceiver circuitry for handling wireless communications in cellular telephone bands such as at 850 MHz, 900 MHz, 1800 MHz, 1900 MHz, 2100 MHz, the LTE bands, and other bands (as examples). Circuitry 34 may handle voice data and non-voice data. If desired, wireless communications circuitry 34 may include global positioning system (GPS) receiver equipment for receiving GPS signals at 1575 MHz or for handling other satellite positioning data.

In some scenarios, radio-frequency transceiver circuitry may be used to communicate simultaneously in different wireless frequency bands. For example, storage and processing circuitry 28 may configure wireless communications circuitry 34 to simultaneously communicate in a Bluetooth frequency band (e.g., in the 2.4 GHz frequency band) and a cellular frequency band (e.g., the 850 MHz cellular frequency band). The diagram of FIG. 2 shows how storage and processing circuitry 28 may be used to control wireless communications circuitry 34 to simultaneously communicate in multiple frequency bands.

Wireless communications circuitry 34 may be configured by storage and processing circuitry 28 to communicate with base station 6 via cellular standards such as GSM, UMTS, LTE, etc. For example, wireless communications circuitry 34 may send and receive radio-frequency signals from base station 6 on radio-frequency bands such as the 850 MHz band. Base station 6 may provide device 10 with access to a cellular network.

Figure 2:
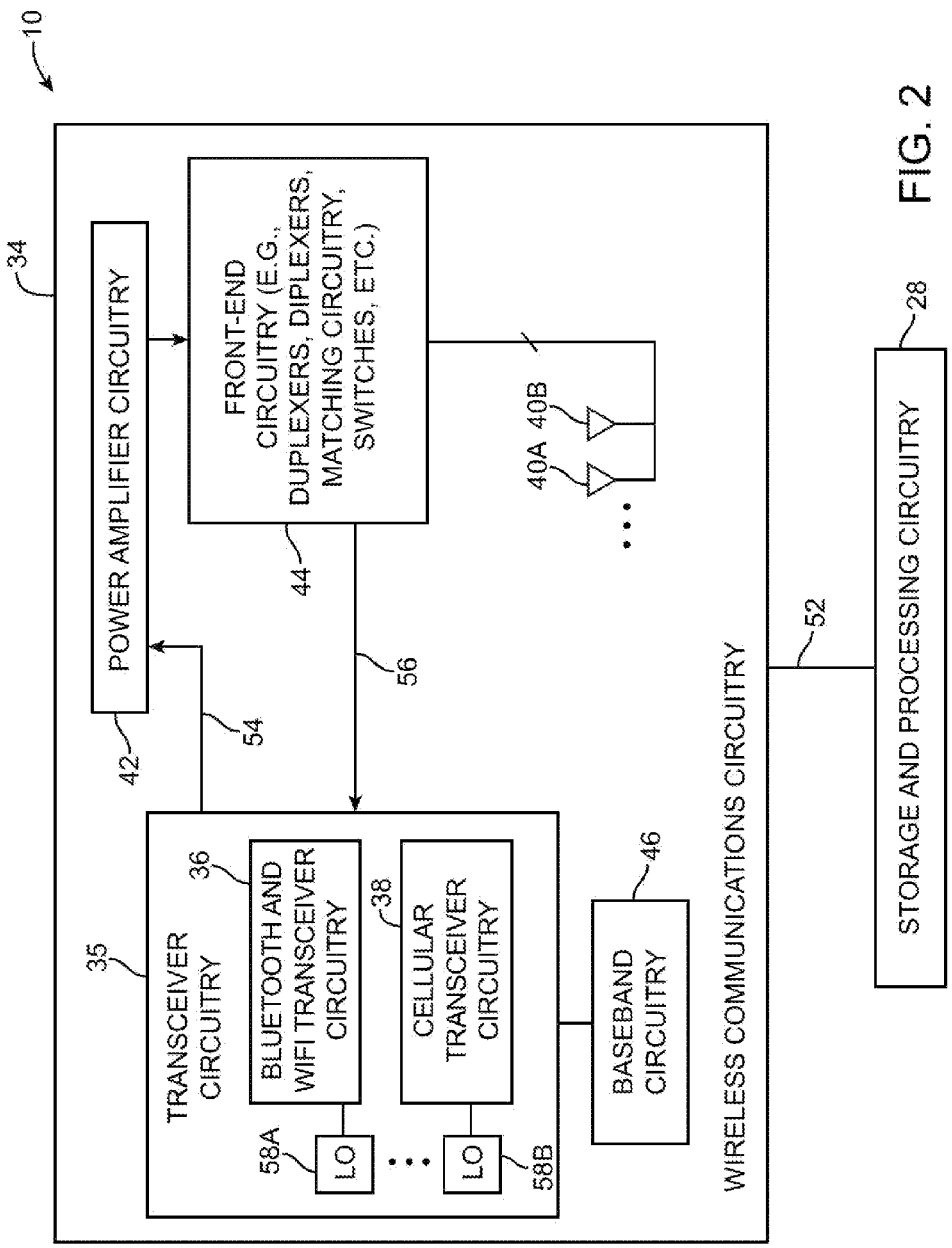
FIG. 2 is a diagram showing how radio-frequency transceiver circuitry may be coupled to multiple antennas for simultaneous communications in multiple frequency bands in accordance with an embodiment of the present invention.

As shown in FIG. 2, wireless communications circuitry 34 may include transceiver circuitry 35, antennas 40A and 40B, power amplifier circuitry 42, front-end circuitry 44, and baseband circuitry 46. Data signals that are to be transmitted by device 10 may be provided by storage and processing circuitry 28 to wireless communications circuitry 34. Baseband circuitry 46 may be implemented using a single integrated circuit (e.g., a baseband processor) or using multiple integrated circuits. Baseband circuitry 46 may receive the data signals to be transmitted, process the data signals, and provide the processed signals to transceiver circuitry 35. Transceiver circuitry 35 may convert the processed signals into radio-frequency signals in a desired frequency band.

Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Transceiver circuitry 35 may provide transmission signals that are in a desired frequency band to power amplifier circuitry 42. During data transmission, power amplifier circuitry 20 may generate amplified transmission signals by boosting the output power of the transmission signals to a sufficiently high level to ensure adequate signal transmission. Power amplifier circuitry 42 may provide the amplified transmission signals to front-end circuitry 44.

Front-end circuitry 44 may include circuitry such as duplexers, diplexers, matching circuitry, switches, or other circuitry for interfacing between the antennas (e.g., antennas 40A and 40B) and power amplifier circuitry 42 or between the antennas and transceiver circuitry 35. During signal transmission, front-end circuitry 44 may provide amplified transmission signals from power amplifier circuitry 42 to antennas 40 for wireless transmission. During signal reception, front-end circuitry 44 may receive radio-frequency signals from antennas 40A and 40B and provide the received radio-frequency signals to transceiver circuitry 35 via path 56.

Transceiver circuitry 35 may include circuitry that converts signals between baseband signals and signals in each desired frequency band (e.g., by down-converting radio-frequency signals received from antennas 40A and 40B or up-converting baseband signals from baseband circuitry 46). Transceiver circuitry 35 may include Bluetooth and WiFi transceiver circuitry 36 that converts transmission data signals from baseband frequencies (e.g., relatively low frequencies) to frequencies in the 2.4 GHz frequency band (e.g., for Bluetooth and WiFi transmissions). Bluetooth and WiFi transceiver circuitry 36 may convert received signals in the 2.4 GHz frequency band to the baseband frequencies and provide the received signals to baseband circuitry 46 for processing.

Transceiver circuitry 35 may include cellular transceiver circuitry 38 that converts cellular transmission data from baseband frequencies into frequencies in a desired cellular frequency band (and vice versa). For example, cellular transceiver circuitry 38 may be configured by storage and processing circuitry 28 to convert baseband signals received from baseband circuitry 46 into radio-frequency signals in the 850 MHz cellular band, the 900 MHz band, the 1800 MHz band, etc.

To communicate on multiple radio-frequency bands, transceiver circuitry 36 may include local oscillators such as local oscillators 58A and 58B. Local oscillator 58A may provide sinusoidal signals to Bluetooth and Wifi transceiver circuitry 36 at frequencies appropriate for processing Bluetooth and WiFi transmissions (e.g., sinusoidal signals with frequencies in the 2.4 GHz band). Local oscillator 58B may provide sinusoidal signals to cellular transceiver circuitry 38 at frequencies appropriate for processing cellular communications. For example, local oscillator 58B may be configured by storage and processing circuitry 28 to produce a sinusoidal signal at 850 MHz for processing signals in the 850 MHz GSM frequency band.

In some configurations, antennas 40A and 40B in device 10 may be physically located relatively close to one another. Antenna 40A may be used for Bluetooth communications and antenna 40B may be used for cellular communications. Due to the close proximity of antennas 40A and 40B within device 10 in at least some device configurations, there may be a potential for interference between bands. This potential for interference may be exacerbated by the presence of non-linear components such as transistors in the transmission signal paths between antennas 40 and transceiver circuitry 35. For example, power amplifier circuitry 42 may include non-linear transistors that amplify transmitted signals. Non-linear components such as transistors may generate undesirable frequency harmonics. As another example, switches in front-end circuitry may have non-linear properties that lead to the generation of second harmonics, third harmonics, and higher-order harmonics when passing radio-frequency signals. The frequency harmonics generated by non-linear components of wireless communications circuitry 34 when transmitting signals in a first communications band can potentially interfere with communications in a second communications band. For example, third order frequency harmonics may lie within the range of frequencies used by the second communications band and interfere with proper signal reception in the second communications band.

During data transmission operations, radio-frequency signals that are generated by transceivers such as cellular transceiver circuitry 38 may be transmitted to antennas 40 through power amplifier circuitry 42 and front-end circuitry 44. Transmitted signals, may, for example, be generated at a frequency f using a sinusoidal signal generated from local oscillator 58B. Frequency f may be associated with the 850 MHz band (or other cellular telephone bands). As the signals at frequency f pass through non-linear components (e.g., switches, transistors, etc.), frequency harmonics may be generated at frequencies such as 2f, 3f, 4f, and higher. In this scenario, a signal harmonic at 2f, 3f, 4f, or higher might be transmitted from one antenna (e.g., antenna 40B) at the same time that signals at frequency f are being transmitted. The frequency harmonics at 2f, 3f, and 4f might then be received by another antenna in the device (e.g., a wireless local area network antenna such as antenna 40A or a satellite navigation antenna). If care is not taken, the received signals at harmonic frequencies of frequency f may cause undesirable interference. For example, a received signal at 2f, 3f, or 4f might fall within or near a communications band used by Bluetooth and WiFi transceiver 36 (or other radio-frequency transceivers).

Figure 3:
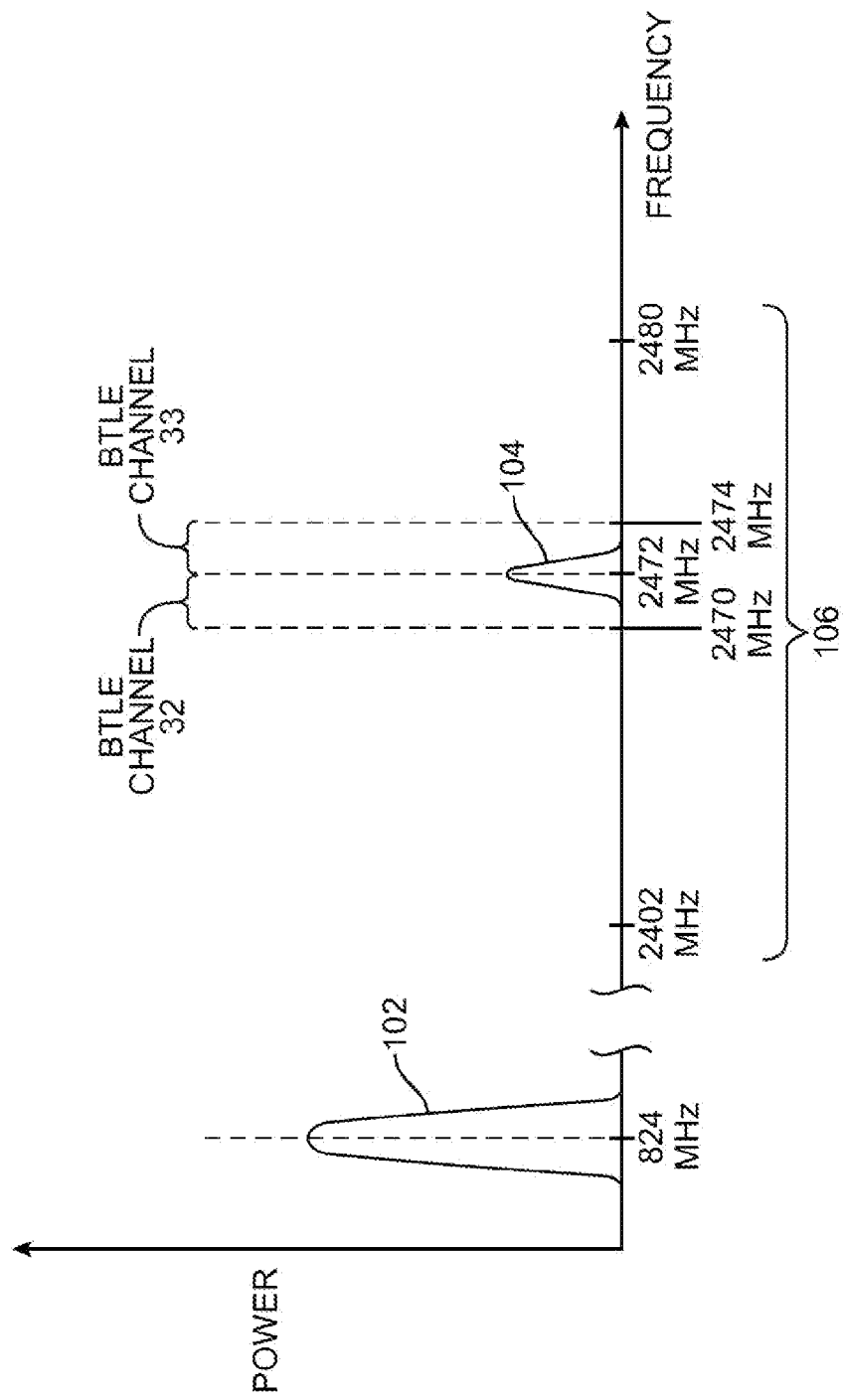
FIG. 3 is a graph showing how cellular radio-frequency communications may interfere with Bluetooth Low Energy communications in accordance with an embodiment of the present invention.

FIG. 3 shows an illustrative example in which frequency harmonics associated with cellular telephone transmissions may affect communications in the Bluetooth frequency band. Device 10 may transmit radio-frequency cellular signals 102 at 824 MHz. For example, device 10 may communicate with a base station in GSM band 850. GSM band 850 may be associated with a range of frequencies between 824 MHz and 849 MHz that are partitioned into frequency channels. In this scenario, device 10 may be assigned channel 128 of GSM band 850 that corresponds to 824 MHz. Wireless transmissions at 824 MHz may pass through non-linear components that generate signals at frequencies outside of the transmission frequency range (e.g., outside of channel 128). Signals 104 that are associated with third order frequency harmonics may be generated at approximately three times 824 MHz (e.g., approximately 2.472 GHz).

Device 10 may operate in Bluetooth Low Energy (sometimes referred to herein as BILE or BLE) communications frequencies at 2.4 GHz. The Bluetooth Low Energy communications frequencies may range from 2.402 GHz to 2.480 GHz and may be partitioned into 35 BILE frequency channels. For example, BILE frequency channel 32 may correspond to frequencies between 2.470 GHz and 2.472 GHz and BILE frequency channel 33 may correspond to frequencies between 2.472 GHz and 2.474 GHz. During BILE communications with other wireless devices, device 10 may periodically switch between the BILE frequency channels. For example, device 10 may communicate with another wireless device using BILE frequency channel 1 in a first time period and using BILE frequency channel 10 in a subsequent time period.

Signals 104 can potentially interfere with BILE communications (e.g., the third order frequency harmonics at 2.472 GHz may fall within the BILE communications frequencies). Signals 104 that are transmitted due to non-linear operation of device 10 may interfere with communications in BILE channels 32 and 33.

To avoid interference between radio-frequency communications protocols (e.g., interference due to undesired frequency harmonics), wireless communications circuitry 34 may be configured to avoid communicating at frequencies that may be impacted by frequency harmonics of simultaneous radio-frequency transmissions. For example, device 10 that is currently communicating using the GSM protocol at 824 MHz may identify that BILE channels 32 and 33 are potentially affected. In this scenario, device 10 may prevent wireless communications circuitry 34 from communicating using BILE channels 32 and 33 (e.g., storage and processing circuitry 28 may provide wireless communications circuitry 34 with control signals via path 52 that direct wireless communications circuitry 34 to avoid BILE frequency channels 32 and 33). For example, device 10 may select BILE communications channels that are not affected by frequency harmonics of simultaneous cellular transmissions.

Device 10 may be configured in a BILE advertising mode in which device 10 broadcasts radio-frequency signals in reserved advertisement frequency channels in the 2.4 GHz frequency band. In some scenarios, cellular communications may interfere with communications in the advertising frequency channels. The example of FIG. 4 shows how transmission of signals 118 at frequency 827 MHz may interfere with simultaneous operation of device 10 in the BTLE advertising mode.

Signals 118 that are transmitted at a frequency of 827 MHz may correspond to channel 142 of GSM band 850 (e.g., device 10 may be assigned channel 142 of GSM band 850 by a cellular base station). Transmission of signals 118 may generate frequency harmonics 120 (e.g., third order frequency harmonics produced by non-linear operation of electronic components in the signal path of signals 118). BTLE channels 37, 38, and 39 may be reserved for communications during the BTLE advertising mode. However, frequency harmonics 120 may interfere with communications in BTLE channel 39. To avoid potential collisions (e.g., interference between frequency harmonics 120 and BTLE communications), device 10 may avoid communications in frequency channel 39. In other words, device 10 may transmit and receive BTLE communications in frequency channels 37 and 38 without communicating in frequency channel 39.

Figure 4:
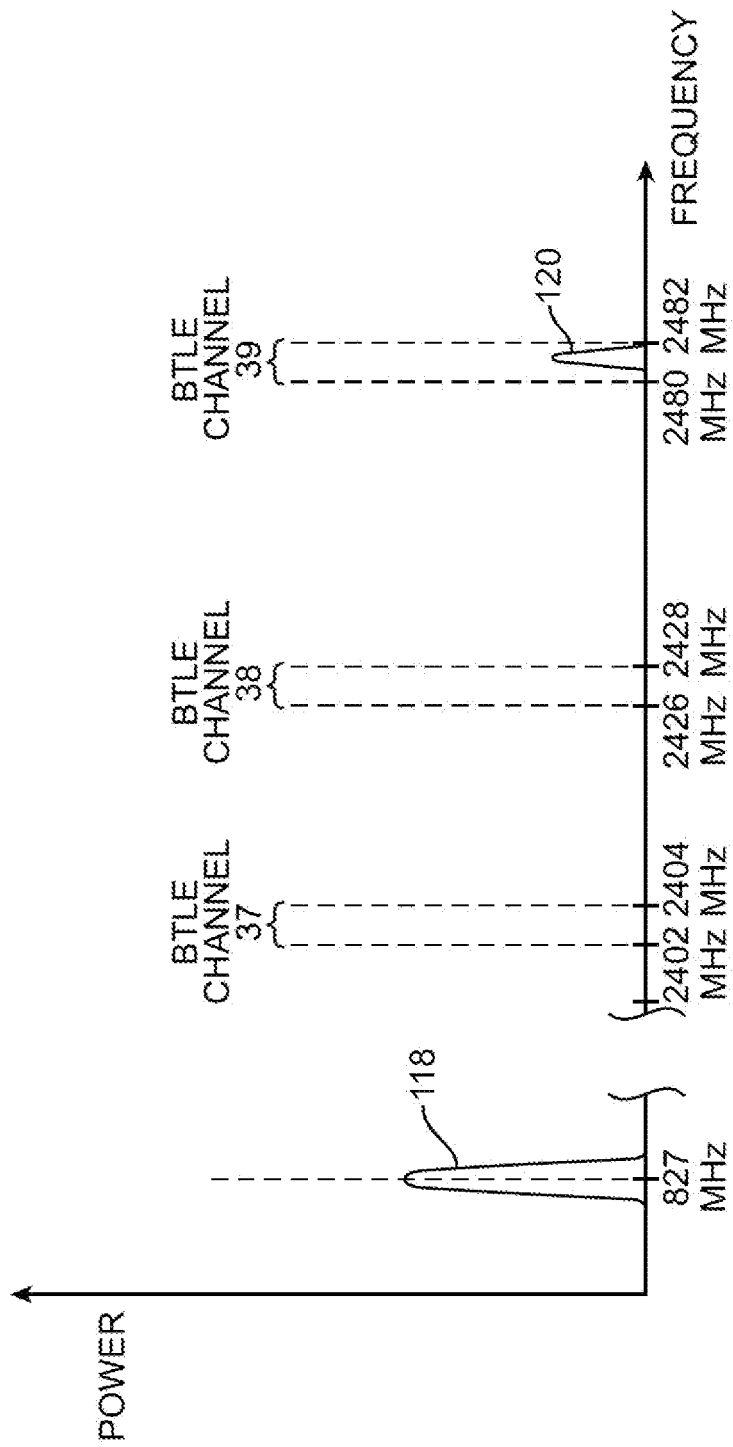
FIG. 4 is a graph showing how radio-frequency signal transmissions may interfere with communications associated with operation of a wireless electronic device in a Bluetooth Low Energy advertising mode in accordance with an embodiment of the present invention.

The example of FIGS. 3 and 4 in which device 10 selects BTLE communication frequencies to avoid interference from transmissions in GSM band 850 is merely illustrative. In general, communications in any given frequency band can potentially produce frequency harmonics (e.g., second order harmonics, third order harmonics, or higher) that interfere with communications in other frequency bands. To avoid potential interference from communications in a given frequency band, device 10 may identify frequencies that are potentially affected by frequency harmonics associated with that given frequency band and avoid communicating using the identified frequencies. As an example, band 5 of the Universal Mobile Telecommunications System (UMTS) standard may correspond to frequencies 824-849 MHz and potentially generate third order frequency harmonics in the frequency range of 2472-2547 MHz. Other standards may also transmit radio-frequency signals in the frequency range 824-849 MHz and potentially generate third order frequency harmonics that interfere with simultaneous communications using BTLE, Bluetooth, WiFi, or other wireless protocols.

Wireless device 10 may serve as a network access point for other WiFi devices. For example, Wireless device 10 may maintain a cellular internet connection with a base station and share the cellular internet connection with other WiFi devices by serving as an access point that the other WiFi devices can connect to. The 2.4 GHz radio-frequency band may be divided into WiFi channels in which wireless device 10 may communicate with the other WiFi devices. The WiFi channels may include 14 channels associated with respective frequency ranges. For example, WiFi channel 11 corresponds to frequency range 2451-2473 MHz, WiFi channel 12 corresponds to frequency range 2456-2478 MHz, and WiFi channel 13 corresponds to frequency range 2461-2483 MHz.

Figure 5:
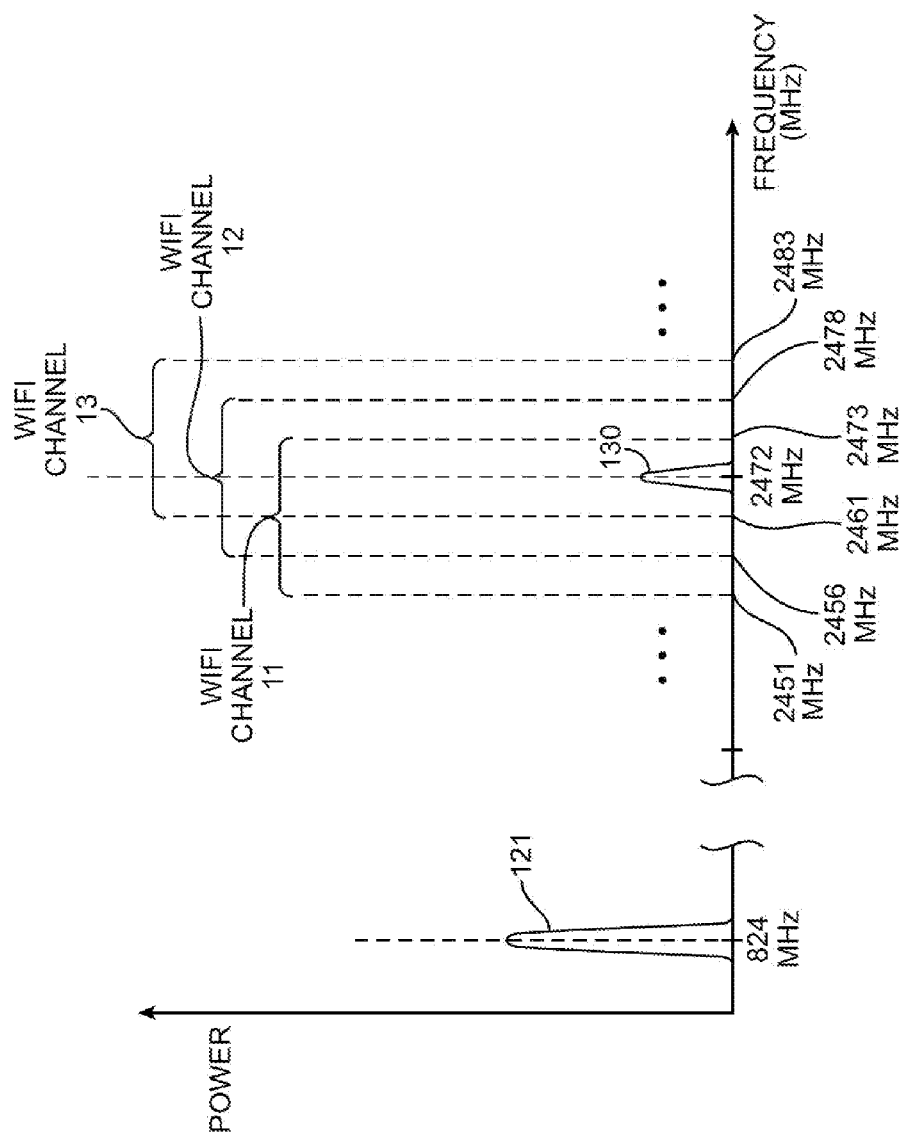
FIG. 5 is a graph showing how cellular communications may interfere with WiFi communications in accordance with an embodiment of the present invention.

In some scenarios, one or more of the WiFi channels may be affected by frequency harmonics associated with the cellular internet connection. FIG. 5 shows an illustrative example in which radio-frequency signals 121 that are transmitted at frequency 824 MHz (e.g., in association with UMTS band 5, GSM band 850, or other radio-frequency communications) may potentially affect access point operation of wireless device 10.

As shown in FIG. 5, transmitted signals 121 may have associated frequency harmonics 130 (e.g., third order frequency harmonics produced by non-linear components). Frequency harmonics 130 may potentially affect multiple WiFi channels such as WiFi channels 11, 12, and 13 that are (e.g., because frequency harmonics 130 may lie in WiFi channels 11, 12, and 13). To help prevent interference between frequency harmonics 130 and WiFi access point operations, device 10 may selectively avoid using the affected WiFi channels. For example, device 10 may choose to operate using WiFi channels 1, 2, 3, or any desired WiFi channel other than channels 11, 12, or 13.

Figure 6A:
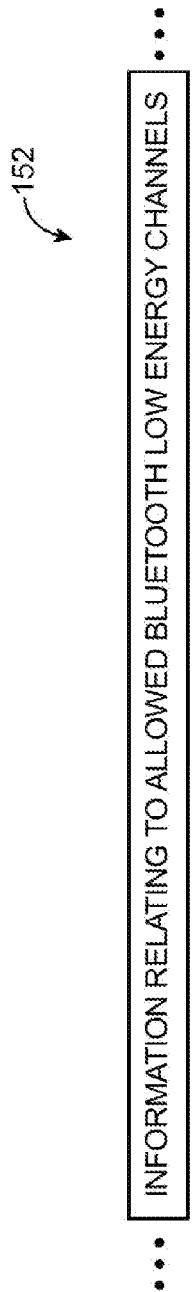
FIG. 6A is an illustrative channel map update command that may be used to configure which Bluetooth Low Energy channels are used by wireless communications circuitry in accordance with an embodiment of the present invention.

To avoid interference between cellular communications and Bluetooth Low energy communications, storage and processing circuitry 28 may send commands to wireless communications circuitry 34 via path 52 that control which Bluetooth Low Energy frequency channels are used for BILE communications. FIG. 6A shows an illustrative channel map update command 152 that may be sent by storage and processing circuitry 28 to wireless communications circuitry 34. As shown in FIG. 6A, channel map update command 152 may include information relating to BILE channels that are not affected by interference from cellular communications. For example, in response to identifying that device 10 is communicating in channel 128 of GSM band 850, storage and processing circuitry 28 may form channel map update command 152 with a list of allowed BILE channels that does not include BILE channels 32 or 33 and send channel map update command 152 to wireless communications circuitry 34.

Figure 6B:
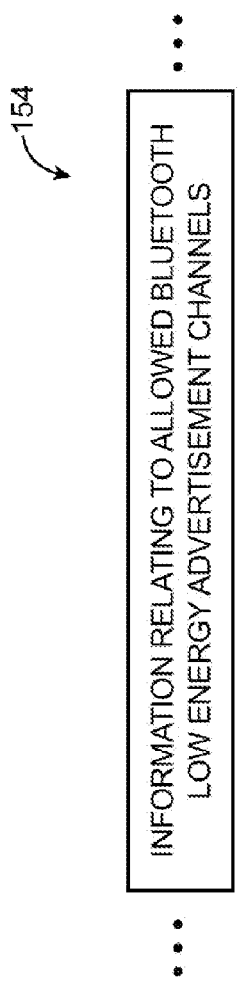
FIG. 6B is an illustrative advertise channel command that may be used to configure which Bluetooth Low Energy advertisement channels are used by wireless communications circuitry in accordance with an embodiment of the present invention.

FIG. 6B shows an illustrative advertise channel command 154 that storage and processing circuitry 28 may send to wireless communications circuitry 34 to control which advertisement channel is used for communications in a BILE advertising mode. As shown in FIG. 6B, advertise channel command 154 may include information relating to allowed BILE advertisement channels (e.g., a list of allowed BILE advertisement channels). As an example, in response to determining that device 10 has been assigned channel 128 of GSM band 850 by a cellular base station, storage and processing circuitry 28 may form advertise channel command 154 that lists BILE channels 37 and 38 (e.g., because BILE channel 39 may be affected by frequency harmonics associated with communications in channel 128 of GSM band 850).

Figure 7:
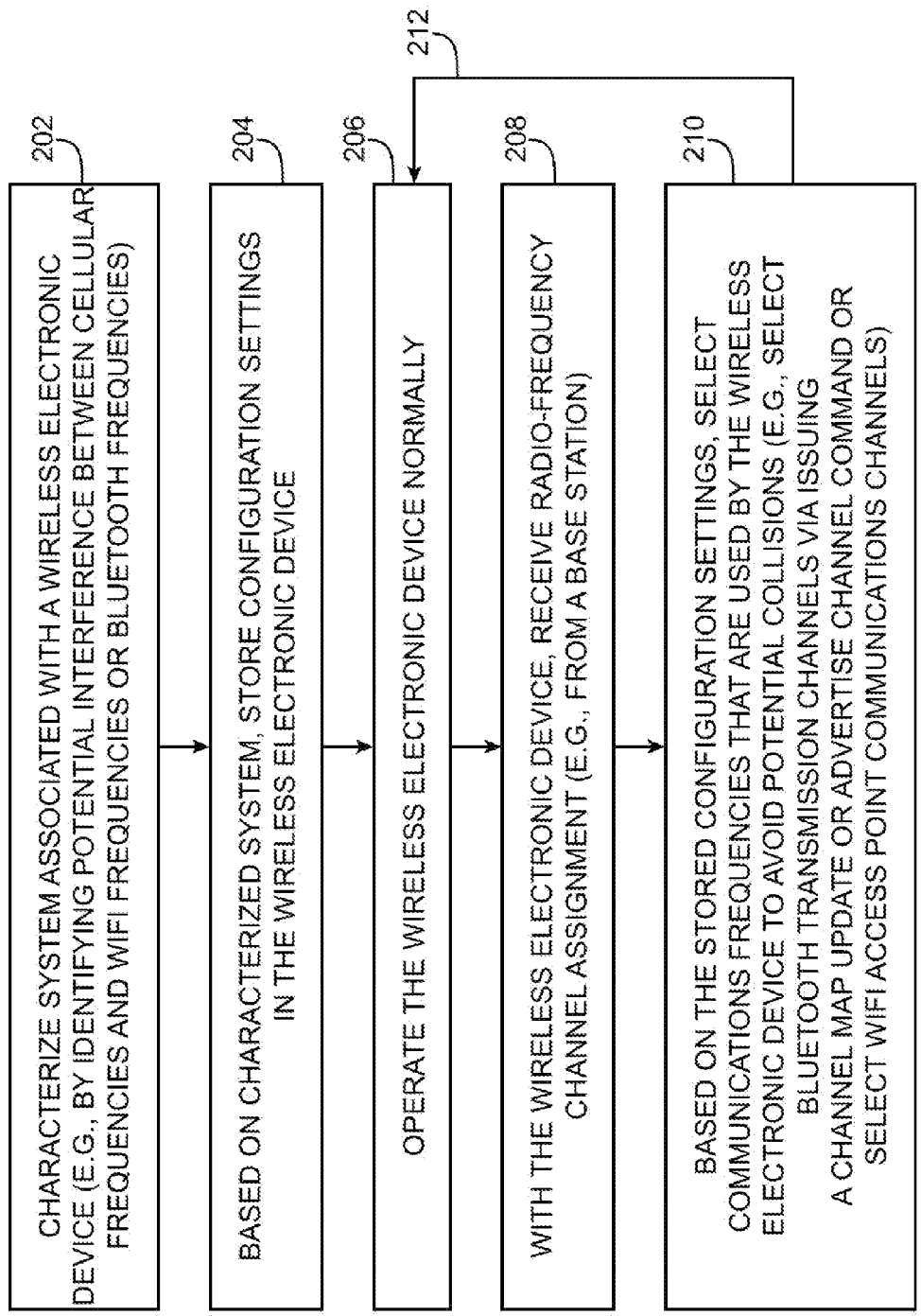
FIG. 7 is an illustrative flowchart of steps that may be performed to avoid interference between communications in multiple frequency bands in accordance with an embodiment of the present invention.

FIG. 7 shows a flowchart of illustrative steps that may be performed to reduce interference between frequency bands.

In step 202, a system in which wireless device 10 may operate on various frequencies in multiple frequency bands may be characterized. The system may be characterized by wireless device 10 or by a user. The system may be characterized by identifying potential interference between communication frequencies. For example, wireless device 10 may have a first antenna used for cellular communications and a second antenna used for WiFi, Bluetooth, and BILE communications. The cellular communications may occur in frequency channels or bands that are assigned to wireless device 10 (e.g., by a cellular base station). In this scenario, the system may be characterized by identifying which frequency channels or bands can be used by the first antenna (e.g., frequencies used for cellular communications) and identifying potential interference with frequency channels or bands that can be simultaneously used by the second antenna (e.g., frequencies used for WiFi or Bluetooth).

In step 204, configuration settings may be stored in wireless device 10. For example, the configuration settings may identify, for each cellular frequency channel assignment, a list of WiFi or Bluetooth channels that may be affected by communications in that cellular frequency channel. The configuration settings may be stored in storage such as storage 28 in wireless device 10.

In step 206, wireless device 10 may operate normally. For example, wireless device 10 may be used to make cellular phone calls, transmit or receive data, receive input from a user, display video, etc.

In step 208, wireless device 10 may receive a radio-frequency channel assignment. For example, wireless device 10 may be used to connect to a cellular network via a base station. The base station may assign a cellular frequency channel or band (e.g., GSM frequency channels or other cellular frequency ranges) to wireless device 10.

In step 210, wireless device 10 may use the stored configuration settings to avoid potential collisions between cellular radio-frequency communications on a first antenna and radio-frequency communications on a second antenna. For example, if wireless device 10 is assigned GSM channel 128 (e.g., assigned to operate at frequency 824 MHz for cellular communications), wireless device 10 may use the stored configuration settings to identify that communications in GSM channel 128 may interfere with simultaneous communications in BILE channels 32 and 33. In this scenario, wireless device 10 may avoid BILE channels 32 and 33 when selecting BILE channels for communications.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of operating an electronic device that has wireless communications circuitry having first and second transceiver circuitry that communicates in at least first and second radio-frequency communications bands, wherein the second radio-frequency communications band is divided into channels, the method comprising:

with storage and processing circuitry in the electronic device, identifying whether frequency harmonics associated with communications in the first radio-frequency communications band interfere with communications in at least one channel of the second radio-frequency communications band; and in response to identifying that the frequency harmonics associated with communications in the first radio-frequency communications band interfere with the at least one channel of the second radio-frequency communications band, providing control signals with the storage and processing circuitry to the wireless communications circuitry that prevent the wireless communications circuitry from communicating in the at least one channel of the second radio-frequency communications band by adjusting the second transceiver circuitry to avoid the frequency harmonics of the communications in the first radio-frequency communications band.

2. The method defined in claim 1 wherein identifying whether frequency harmonics associated with communications in the first radio-frequency communications band interfere with communications in the at least one channel of the second radio-frequency communications band comprises:

retrieving configuration data from a database stored in the storage and processing circuitry, wherein the configuration data indicates which of the channels are affected by interference from the frequency harmonics that are associated with communications in the first radio-frequency communications band.

3. The method defined in claim 1 wherein the second radio-frequency communications band comprises a Bluetooth frequency band and wherein providing control signals with the storage and processing circuitry to the wireless communications circuitry that prevent the wireless communications circuitry from communicating in the at least one channel comprises:

providing control signals with the storage and processing circuitry to the wireless communications circuitry that prevent the wireless communications circuitry from communicating in the at least one channel of the Bluetooth frequency band.

4. The method defined in claim 3 wherein the wireless communications circuitry communicates in the Bluetooth frequency band using the Bluetooth Low Energy protocol and wherein providing control signals with the storage and processing circuitry to the wireless communications circuitry comprises:

sending a channel map update command with a list of allowed channels to the wireless communications circuitry, wherein the list of allowed channels does not include the at least one channel of the Bluetooth frequency band.

5. The method defined in claim 1 wherein the first radio-frequency communications band comprises a cellular telephone frequency band, wherein identifying whether the frequency harmonics associated with communications in the first communications band interfere with communications in the at least one channel of the second radio-frequency communications band comprises:

identifying whether frequency harmonics associated with communications in the cellular telephone frequency band interfere with communications in the at least one channel of the second radio-frequency communications band.

6. The method defined in claim 5 wherein the cellular telephone frequency band comprises Global System for Mobile (GSM) band 850 and wherein identifying whether the frequency harmonics associated with communications in the cellular telephone frequency band interfere with communications in the at least one channel of the second radio-frequency communications band comprises:

identifying whether frequency harmonics associated with communications in GSM band 850 interfere with communications in the at least one channel of the second radio-frequency communications band.

7. The method defined in claim 5 wherein the cellular telephone frequency band comprises Universal Mobile Telecommunications System (UMTS) band 5 and wherein identifying whether the frequency harmonics associated with communications in the cellular telephone frequency band interfere with communications in at least one channel of the second radio-frequency communications band comprises:

identifying whether frequency harmonics associated with communications in UMTS band 5 interfere with communications in the at least one channel of the second radio-frequency communications band.

8. The method defined in claim 5 wherein the second radio-frequency communications band comprises a WiFi communications band and wherein identifying whether the frequency harmonics associated with communications in the cellular telephone frequency band interfere with communications in the at least one channel of the second radio-frequency communications band comprises:

identifying whether the frequency harmonics associated with communications in the cellular telephone frequency band interfere with communications in at least one channel of the WiFi communications band.

9. A method of operating an electronic device that has wireless communications circuitry that communicates in at least first and second radio-frequency communications bands, wherein the second radio-frequency communications band is divided into channels and wherein the first radio-frequency communications band comprises a cellular telephone frequency band, the method comprising:

with storage and processing circuitry in the electronic device, identifying whether frequency harmonics associated with communications in the first radio-frequency communications band interfere with communications in at least one channel of the second radio-frequency communications band, wherein identifying whether the frequency harmonics associated with the communications in the first communications band interfere with the communications in the at least one channel of the second radio-frequency communications band comprises identifying whether frequency harmonics associated with communications in the cellular telephone frequency band interfere with communications in the at least one channel of the second radio-frequency communications band;

in response to identifying that the frequency harmonics associated with communications in the first radio-frequency communications band interfere with the at least one channel of the second radio-frequency communications band, providing control signals with the storage and processing circuitry to the wireless communications circuitry that prevent the wireless communications circuitry from communicating in the at least one channel of the second radio-frequency communications band by adjusting the communications in the second radio-frequency communications band; and with the wireless communications circuitry, receiving instructions from a base station that direct the wireless communications circuitry to communicate in a frequency range within the cellular telephone frequency band, wherein identifying whether the frequency harmonics associated with communications in the cellular telephone frequency band interfere with communications in the at least one channel of the second radio-frequency communications band comprises:

identifying whether frequency harmonics associated with communications in the frequency range interfere with communications in the at least one channel of the second radio-frequency communications band.

10. An electronic device, comprising:

a first transceiver configured to communicate in a first radio-frequency communications band;

a second transceiver configured to communicate in a second radio-frequency communications band that is different from the first radio-frequency communications band;

storage and processing circuitry configured to adjust the second transceiver in response to determining that the first transceiver produces frequency harmonics that interfere with communications in the second radio-frequency communications band, wherein adjusting the second transceiver comprises adjusting the second transceiver to avoid the frequency harmonics of the first transceiver.

11. The electronic device defined in claim 10 wherein the second radio-frequency communications band is divided into channels, wherein the storage and processing circuitry is configured to identify which channels are affected by frequency harmonics produced by the first transceiver.

12. The electronic device defined in claim 11 wherein the storage and processing circuitry is configured to send control signals to the second transceiver that direct the second transceiver to avoid communicating in channels that are affected by frequency harmonics produced by the first transceiver.

13. The electronic device defined in claim 10 further comprising an antenna, wherein the first transceiver is configured to communicate with a cellular base station by transmitting radio-frequency signals from the antenna in the first radio-frequency communications band.

14. The electronic device defined in claim 13 further comprising an additional antenna, wherein the second transceiver comprises a Bluetooth transceiver that is configured to transmit radio-frequency signals in the second radio-frequency communications band from the additional antenna.

15. The electronic device defined in claim 13 wherein the second transceiver comprises a WiFi transceiver.

16. A method of operating an electronic device, comprising:

with wireless communications circuitry, receiving instructions from a base station that direct the electronic device to communicate with the base station in a first frequency channel;

with processing circuitry having first and second transceivers, retrieving information from a database that identifies whether frequency harmonics associated with communications in the first frequency channel by the first transceiver interfere with communications in a second frequency channel by the second transceiver; and with processing circuitry, configuring the wireless communications circuitry to avoid communicating in the second frequency channel by adjusting the second transceiver to avoid the frequency harmonics of the first frequency channel.

17. The method defined in claim 16 wherein configuring the wireless communications circuitry to avoid communicating in the second frequency channel comprises:

with the processing circuitry, configuring the wireless communications circuitry to communicate in a third frequency channel that is different from the second frequency channel.

18. The method defined in claim 17 wherein the second transceiver comprises a Bluetooth transceiver and wherein configuring the wireless communications circuitry to communicate in the third frequency channel comprises:

with the processing circuitry, sending a channel map update command to the wireless communications circuitry that identifies the third frequency channel.

19. The method defined in claim 18 wherein the first transceiver comprises a cellular transceiver and wherein receiving instructions from the base station comprises:

with the cellular transceiver, receiving instructions from the base station.

20. The method defined in claim 17 wherein the second transceiver comprises a WiFi transceiver and wherein configuring the wireless communications circuitry to communicate in the third frequency channel comprises:

configuring the WiFi transceiver to transmit radio-frequency signals in the third frequency channel.

\* \* \* \* \*